United States Patent [19]

Huang et al.

[11] Patent Number: 4,899,699
[45] Date of Patent: Feb. 13, 1990

[54] LOW PRESSURE INJECTION SYSTEM FOR INJECTING FUEL DIRECTLY INTO CYLINDER OF GASOLINE ENGINE

[75] Inventors: Huei-Huay Huang; Yu-Yin Peng, both of Hsin Chu Hsien, Taiwan

[73] Assignees: Chinese Petroleum Company, Taipei; Industrial Technology Research Institute, Hsien, both of Taiwan

[21] Appl. No.: 164,334

[22] Filed: Mar. 4, 1988

[51] Int. Cl.$^4$ ............................................. F02B 19/08
[52] U.S. Cl. .................................. 123/73 C; 123/305; 239/585
[58] Field of Search .............. 123/239, 472, 73 C, 123/298, 305; 239/585

[56] References Cited

U.S. PATENT DOCUMENTS

| | | | |
|---|---|---|---|
| 2,246,019 | 6/1941 | Steinlew | 123/73 C |
| 3,096,751 | 7/1963 | Millar | 123/73 C |
| 3,190,271 | 6/1965 | Gudmundsen | 123/73 C |
| 4,168,804 | 9/1979 | Hofmann | 239/533.11 |
| 4,275,844 | 6/1981 | Grgurich et al. | 239/533.3 |
| 4,327,675 | 5/1982 | Takeda | 123/472 |
| 4,515,129 | 5/1985 | Stettner | 123/472 |
| 4,524,743 | 6/1985 | McAuliffe et al. | 123/472 |
| 4,633,830 | 1/1987 | Oshima et al. | 123/472 |
| 4,753,213 | 6/1988 | Schlunke et al. | 123/73 C |

*Primary Examiner*—David A. Okonsky
*Attorney, Agent, or Firm*—Cushman, Darby & Cushman

[57] ABSTRACT

A low pressure fuel injection system, especially suitable to be applied to a two-stroke gasoline engine, mainly comprises a solenoid-operated fuel injector which is mounted on cylinder wall in order to inject fuel directly into cylinder. The injector has a specially-designed injection valve assembly including a valve needle and a valve body that could execute in-cylinder injection under low fuel pressure, eg. 3 kg/cm$^2$, without causing any problem accompanied with.

2 Claims, 3 Drawing Sheets

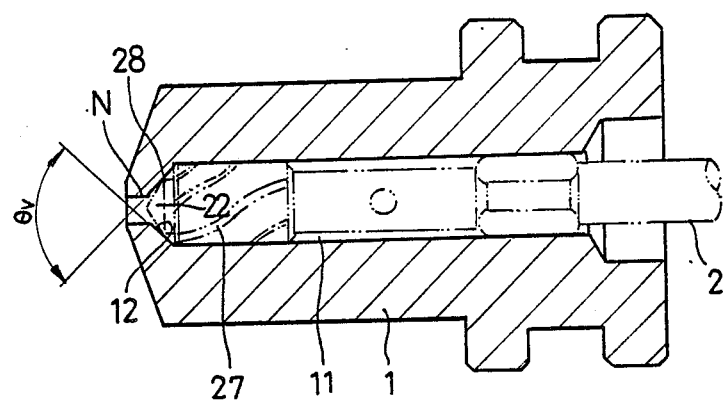
FIG. 3
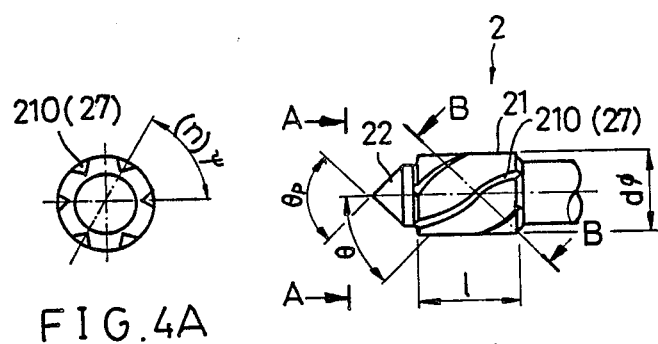
FIG. 4A
FIG. 4
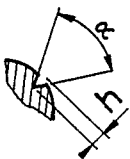
FIG. 4B

LOW PRESSURE INJECTION SYSTEM FOR INJECTING FUEL DIRECTLY INTO CYLINDER OF GASOLINE ENGINE

BACKGROUND OF THE INVENTION

The main object of the present invention is to provide a low pressure fuel injecting device for the two-stroke gasline engine so as to replace the conventional carburetor and to overcome the drawbacks of the high exhaust pollution and the high fuel consumption rate of the conventional two-stroke gasoline engine.

The major problem of causing a high fuel consumption rate and high pollution is that during the scavenging process, a part of the fresh mixture newly sucked into the cylinder escapes out together with the exhaust, i.e., the so-called short-circuit of fuel; the part which escapes out is usually ranging from 25-40% of the fresh mixture. In order to solve the aforesaid problems, adopting an in-cylinder fuel injection to replace fuel-and-air premixing of conventional carburetors will be an effective method, and the throttle body is only utilized to control the intake air flow without metering fuel, so that during the scavenging process, only the pure air is sucked into the cylinder. After the scavenging process is ended, the injector will inject fuel into the cylinder for combustion. This in-cylinder injecting system can eliminate the drawback of the short-circuit of fuel; however, on the prior arts, there are technical difficulties that have to be overcome.

According to conventional injection technique for a two-stroke diesel engine, the injector is mounted on the cylinder head. After the scavenging process is ended, and the piston closes the exhaust port, the injector will inject the diesel fuel so as to prevent the short-circuit of fuel from occurring. However, in order to prevent the fuel inside the injector from being vaporized caused by the heat soak from the high temperature of the cylinder head, the pressure of the fuel has to be extremely elevated to be higher than the "Reid vapor pressure" of the fuel under the in-cylinder highest temperature. Such a system is called a high pressure injection, which needs high precision components such as injection, pump, nozzle, tubing . . . etc. Therefore, from the standpoint of cost, it has never been successfully commercialized to a two-stroke gasoline engine.

Though the current fuel injection system usually used in four-stroke gasoline engine; is a low pressure one, in which the fuel pressure ranges from 1 kg/cm$^2$ to 3 kg/cm$^2$, the fuel is injected into the intake manifold or the throttle valve, i.e., the so-called "outside of cylinder" injection method. The environment condition of the aforesaid injection position is simple. In case of such a low pressure injection method being used inside a cylinder, the nozzle of the injector is susceptible to being fould on its tip, and the fuel inside the nossle is also susceptible to being vaporized under the heat soak from the cylinder; the nozzle will be unable to maintain its metering accuracy any longer as a result of fouling on its tip and fuel vaporizing inside. The main factors of nozzle tip fouling are caused by the blowing of exhaust gas and the carbonization of residual fuel drop after injection, and under such a low pressure, it is difficult for the fuel flow to remove the carbon deposited. Specifically, no matter what a hole type or needle type of the current injector, is used, the cross sectional area of its nozzle outlet determines the flow rate of fuel injected; therefore, a nozzle deposited with carbon would affect the fuel flow rate desired.

Moreover, the electro-magnetic valve assembly in the injector could lose its normal dynamic characteristics as a result of long time wear-and-tear and material fatigue (such as spring parts). Almost all the conventional gasoline injectors are of fixed structure type, and whenever their dynamic characteristics are out of order, they will be unable to repair and correct.

SUMMARY OF THE INVENTION

The present invention can solve the aforesaid problems, such as vapor formation inside the nozzle due to overheating under low fuel pressure, the deposited carbon on the nozzle, and the disorder of the electro-magnetic valve, by means of a specially designed fuel injector and injecting position of the injector in the cylinder. The present invention is particularly adapted to the two-stroke gasoline engine to inject fuel directly into the cylinder at a low pressure, e.g. 3 kg/cm$^2$, same as the pressure at which the aforesaid current gasoline injection systems operate.

The primary object of the present invention is to provide a solenoid-operated type of injector to be mounted on the cylinder wall under the cylinder head (instead of being mounted on the cylinder head) so as to have the atomized fuel mixed up with the air in the cylinder before being ignited by the spark plug. The injector includes an electro-magnetic assembly, of which the magnetic force is generated to control an injecting valve assembly to open and close the injecting valve assembly consisting of a valve needle and a valve body, and the front end of the valve needle is a round stem portion with several spiral grooves on its peripheral as fuel passages. The cross-sectional area of the outlet orifice in front of said valve body is designed larger than the total cross-sectional area of those spiral grooves, so that those spiral fuel passages, formed between the inner surface of the valve body and those grooves, serve not only for promoting fuel swirl motion but also for controlling the fuel flow rate.

Another object of the present invention is to provide an injector to be mounted on the cylinder wall of a two-stroke gasoline engine, and the outlet of that injector is positioned above scavenging port that is opposite the exhaust port the fuel is injected towards the center of the cylinder head.

Still another object of the present invention is to provide an injection valve assembly, in which the angle of the front conical surface of the valve needle is slightly larger than that of the inner cone seat of the valve body, ranging from 2-4°.

A further object of the present invention is to provide an injector, in which the ratio between the length and the diameter of the round stem portion of the valve needle is best ranging from 1-1.5.

A still further object of the present invention is to provide an injector, in which an adjusting assembly is furnished. The magnetic tubular stator is mounted in the center of a magnetic shoulder in an adjustable movable manner by means of threads so as to adjust the space between the magnetic tubular stator and the armature, and also to adjust the spring load between the spring adjusting tube and the armature.

BRIEF DESCRIPTION OF THE DRAWINGS

FIG. 3 is a detailed view of the valve body and the valve needle of the injecting valve assembly in front of the injector of the present invention.

FIG. 4 is a detailed view of the front end of the valve needle according to the present invention.

FIG. 4A is a front view along line A—A in FIG. 4.

FIG. 4B is a sectional view along line B—B in FIG. 4.

DETAILED DESCRIPTION

Figure 1:
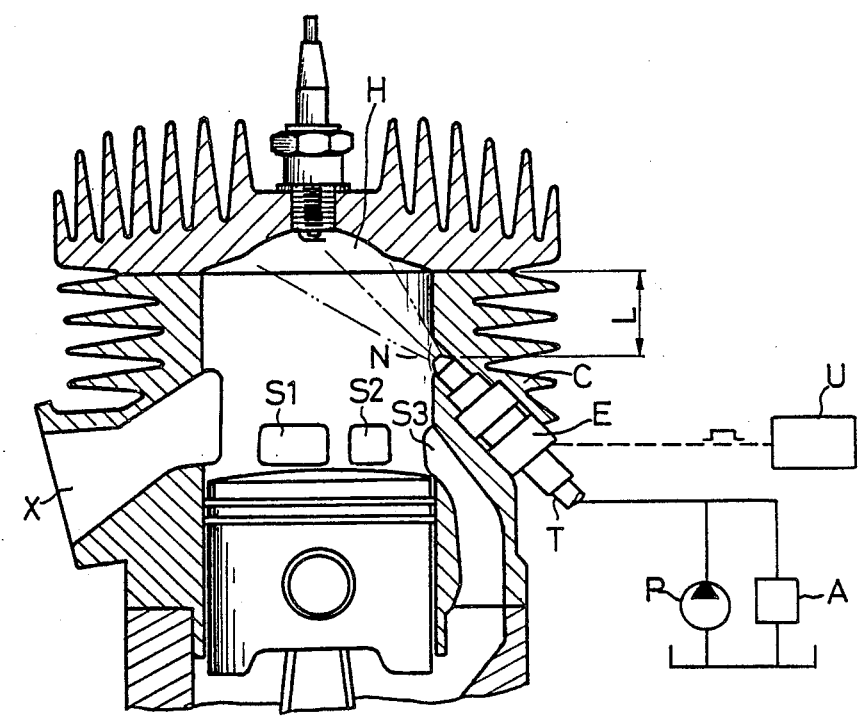
FIG. 1 is a sectional view of the low-pressure fuel injection system applied to a two-stroke gasoline engine according to the present invention.

Referring to FIG. 1, there is shown an injection system for injecting atomized fuel under low fuel pressure directly into a two-stroke gasoline engine, which comprises an injector E, a low pressure fuel pump P and a pressure regulator A, the injector E is mounted on the cylinder wall C; the outlet N of the injector is positioned above the third scavenging port $S_3$ opposite the exhaust port X, and at a suitable distance L from the cylinder head H. The purpose of maintaining that suitable distance L from the cylinder head H is to mount the injector E far away from the high temperature and high pressure area under the cylinder head H so as to lower the system pressure. At that mounting position with suitable distance L from the head, the "Reid Vapor Pressure" of the fuel inside the injector under heat soaking is being less than the system fuel pressure, e.g. 3 kg/cm$^2$, therefore, it maintains a solid fuel injection without any vapor. The injection axis of the injector E is directed to the center of the cylinder head H, i.e., the igniting spot. Since the space around the ignitor will have richer mixture, the limit of fuel-to-air ratio of mixture can be further reduced to some degree. In other words, a better combustion result can be obtained. The fuel pressure is set up by the pump P, and is regulated through a pressure-regulating valve A so as to maintain the pressure at a given level e.g. 3 kg/cm$^2$. The fuel with a constant pressure is fed into the top T of the injector E. The engine control unit U can generate a pulse signal to control the injector E to inject a desired amount of fuel into the cylinder so as to be mixed with the air in the cylinder for ignition. Specifically, during the scavenging process, only fresh air will be driven into the cylinder through the scavenging -passages $S_1$, $S_2$ and $S_3$; as soon as the scavenging process is ended, the fuel will be injected into the cylinder; in other words, during that scavenging process, any fresh air without fuel escaping into the exhaust port is a pure air, but not a unburned mixture as usually happened in a conventional engine; therefore, the present invention can prevent the loss of fuel short-circuit. The fuel injected can be controlled with a conventional method, of which the details are omitted.

As for the aforesaid injection position, the environment surrounding the injector nozzle is at a lower temperature, and the fuel is to be injected at a low pressure supply; the nozzle is liable to deposit some carbon. The carbon deposited around the nozzle tip will jeopardize the accuracy of fuel volume injected by a conventional injector. In the present invention, a specially designed injector is used to overcome the aforesaid drawback of the conventional injector, and to maintain the injector metering accuracy so as to be used for a considerably long time under such an injection condition.

Figure 2:
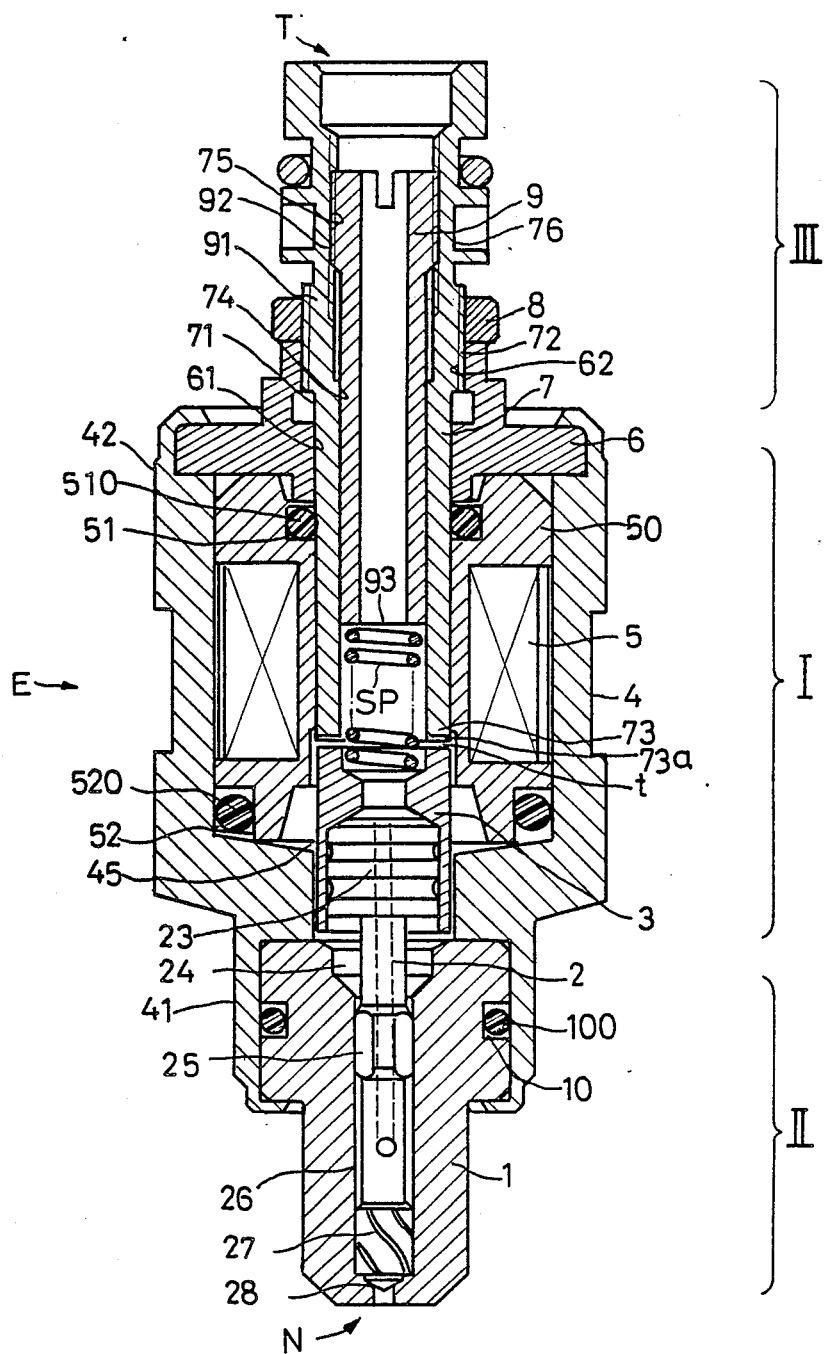
FIG. 2 is a sectional view of the injector according to the present invention.

FIG. 2 illustrates a sectional view of the injector E of the present invention, which mainly includes an electro-magnetic assembly I, an injection valve assembly II, and an assembly III for adjusting spring force and valve lift. The electro-magnetic assembly I further includes a coil 5 wound around a bobbin 50; the coil 5 is led outwards (not shown) for connecting with the lead of control signal. Both ends of the bobbin 50 are furnished with two grooves 51 and 52 respectively for mounting two 0-shaped oil seals 510 and 520. The coil 5 is mounted inside the housing 4, which is made of soft magnetic material as a part of the magnetic circuit. The front end 41 of the housing 4 is fixed together with the injecting-valve assembly II, while the rear end thereof is fixed together with a magnetic shoulder 6 and the adjusting assembly III for force and valve lift. An armature 3 is located in a cavity 45 of the housing 4. The magnetic shoulder 6 is also made of a soft magnetic material to form a part of the magnetic circuit. The inner surface 61 of the magnetic shoulder and the outer surface 71 of the magnetic tubular stator 7 are mounted together in a rotative manner. The magnetic tubular stator 7 is an important part in the magnetic circuit, and is made of a material with a high magnetic conductivity. The outer end of the magnetic tubular stator 7 is furnished with threads 72 to be engaged with the inner threads 62 of the magnetic shoulder 6. When making relative rotation between the magnetic tubular stator 7 and the magnetic shoulder 6, the space t between the inner end of the magnetic tubular stator 7 and the armature 3 with which the valve needle 2 is fixed; the space t will determine the moving distance upon the valve needle 2 being attracted by the armature 3, i.e., the lift of the valve needle 2. The lift can be fixed by fixing the magnetic shoulder 6 and the magnetic tubular stator 7 in place with a nut 8. The inner end 73 of the magnetic tubular stator 7 is attached, by adhesive or plating, with a lamina 73a of non-magnetic material so as to maintain a non-magnetic space between the armature 3 and the magnetic tubular stator 7 when the valve is open and the armature 3 reaches the inner end 73 for the purpose of facilitating the armature 3 to separate from the stator 7 quickly upon the actuating current being cut off. The outer surface 91 of the spring adjusting tube 9 in the inner surface 74 of the magnetic tubular stator 7 is engaged with the stator 7 by means of the thread portions 75 and 92 so as to facilitate the stator 7 and the tube 9 to rotate relatively for adjusting the compression force of the spring SP mounted between the inner end 93 of the tube 9 and the armature 3, whereby the dynamic response characteristics of the armature 3 can be adjusted. After the spring load being fixed, the position of the spring adjusting tube 9 can be fixed in place by deforming the recess 76 on the magnetic tubular stator 7.

The injecting valve assembly II includes a valve body 1 and a valve needle 2. The valve body 1 and the housing 4 are fixedly combined together, and are sealed with a groove 10 and an oil seal 100. The center of the valve body 1 has a hole for mounting the valve needle 2 therein in a movable manner. The inner end of the valve needle 2 and the armature 3 are fixedly connected together, but there is a fuel passage 23 there between. There are also fuel passages 24, 25, 26, spiral fuel passage 27, between the valve needle 2 and the valve body 1. The details of these passages, and the outlet orifice N will be described below. When the injecting valve assembly is opened upon the valve needle 2 and the armature 3 being attracted by the stator 7, the fuel flowing through the top end T of the injector E, the spring adjusting tube 9, the space in the spring SP and the aforesaid fuel passages will be injected and atomized out of the orifice N.

FIG. 3 illustrates a detailed view of the valve body 1 and the valve needle 2; the center of the valve body 1 has a passage 11, in which the valve needle 2 is mounted in a slidable manner. The front end of the passage 11 is furnished with a $\theta$-angled cone seat 12 behind the outlet orifice N. The contact part between the cone seat 12 and the conical surface 22 of the valve needle 2 forms into the seal 28; in other words, fuel will be injected out upon the valve needle 2 being moved away from the cone seat 12. The fuel amount injected for each cycle is concerned with the fuel flow rate (fuel volume injected per second) from the outlet orifice, so that the fuel flow rate, which is determined by the cross sectional area of passages restricting fuel flow must be keep constant for long time use. Unlike the aforesaid conventional fuel injector, which control its fuel flow rate through its outlet orifice, the fuel flow rate of the injecting valve assembly in the present invention is determined by the total cross-sectional area of the spiral grooves of fuel passages 27, in others words, the cross-sectional area of the outlet orifice N is much larger than that of those spiral grooves, e.g. larger than twice of that. Since the spiral grooves are behind the seal 28 and fuel of fouling, the injector could maintains its metering accuracy for a long time even that the outlet orifice of nozzle tip could possibly be fouled.

As shown in FIGS. 4, 4A and 4B the front end of the valve needle 2 has a round stem portion 21 being mounted slidably in the passage 11 of the valve body 1; the outer surface of the round stem portion 2 is furnished with several spiral fuel passages 210 (six passages shown in FIG. 4A) deposed at an equal angle $\psi$ (60 degrees shown in FIG. 4A). The spiral fuel passage 210 may be formed into any suitable sectional form (for instance, the spiral fuel passage shown in FIG. 4B is a triangle-shaped groove at an angle of $\alpha$ with a depth h. The spiral fuel passage 210 is formed into an oblique angle $\theta$ so as to have the fuel moved in a spiral manner to promote the fuel swirl motion for better atomization. The oblique angle $\theta$ is dependent upon the spray angle of the atomized fuel required. The most front end of the round stem portion 21 forms into a conical surface 22 at an angle of $\theta p$. The relation between the conical surface 22 and the cone seat 12 is that the angle $\theta v$ of the cone seat 12 is slightly less, about 2-4 degrees, than the angle $\theta p$ of the conical surface 22; in that case, the best atomized result can be obtained from experiment. The best ratio $l/d$ between the length $l$ and the diameter $d$ of the round stem portion 21 should be within the range from 1 to 1.5 times.

Briefly, the present invention has the following advantages: 1. To eliminate the loss of short-circuit of fuel upon being used in a two-stroke gasoline engine because of the pure-air scavenging. 2. To provide a richer gas mixture in the surrounding around the spark ignition so as to obtain a better combustion result. 3. To lower the cost of whole system by special configuration of the fuel injection position for obtaining low-pressure injection. 4. The injector having the assembly for adjusting the valve lift and spring can lower the accuracy required during manufacturing process to satisfy the calibration requirement for dynamic response after long time operation.

We claim:

1. A low pressure injection system for injecting fuel directly into a cylinder of a gasoline engine, comprising:

a solenoid-operated fuel injector mounted on a wall of the cylinder in such a manner that an outlet is just above a scavenging port of said engine opposite an exhaust port with an injecting axis of the injection being directed to a surrounding area around a spark plug, an electric low pressure fuel pump, and a pressure regulator which maintains fuel pressure at a fixed level, e.g., $3kg/cm^2$, said fuel injector being mounted on the cylinder wall away from a cylinder head of said engine so as to inject atomized fuel for mixing with air inside the cylinder, said fuel injector including a coil, an armature, a valve needle, and a valve body, said valve needle having a round stem portion with several spiral grooves with an angle of a spiral passage of each groove varying with respect to a central axis along a length of each groove on its outer circumference, the cross-sectional area of the outlet of said valve body being larger than a total cross-sectional area of said spiral grooves so that said spiral grooves serve to promote the fuel swirl motion and to control the fuel flow rate.

2. A low pressure injection system for injecting fuel directly into a cylinder of a gasoline engine, comprising:

a solenoid-operated fuel injector, including an adjusting assembly which includes a magnetic tubular stator mounted in the center of a magnetic shoulder for adjusting by means of threads, a space defined by the lift of a valve needle between an armature of the fuel injector and an end of said magnetic tubular stator, and a spring adjusting tube mounted in said magnetic tubular stator for adjusting, by means of threads, the axial space between said magnetic tubular stator and said adjusting tube so as to regulate a spring load of a spring located between said adjusting tube and said armature, an electric low pressure fuel pump, and a pressure regulator which maintains fuel pressure at a fixed level, e.g. $3kg/cm^2$; said fuel injector being mounted on a cylinder wall away from a cylinder head of said engine so as to inject atomized fuel, for mixing with air inside the cylinder, said fuel injector further comprising a coil and a valve body, said valve needle having a round stem portion with several spiral grooves on its outer circumference, the cross-sectional area of an outlet of said valve body being larger than the total cross-sectional area of said spiral grooves so that said spiral grooves serve to promote the fuel swirl motion and to control the fuel flow rate.

* * * * *